United States Patent
Djordjevic et al.

(10) Patent No.: US 9,465,169 B2
(45) Date of Patent: Oct. 11, 2016

(54) SINGLE SHOT CORRECTION OF RESONANT OPTICAL COMPONENTS

(71) Applicant: Oracle International Corporation, Redwood City, CA (US)

(72) Inventors: Stevan S. Djordjevic, San Diego, CA (US); Shiyun Lin, San Diego, CA (US); Ivan Shubin, San Diego, CA (US); Xuezhe Zheng, San Diego, CA (US); John E. Cunningham, San Diego, CA (US); Ashok V. Krishnamoorthy, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/625,023

(22) Filed: Feb. 18, 2015

(65) Prior Publication Data

US 2016/0238791 A1 Aug. 18, 2016

(51) Int. Cl.
| | |
|---|---|
| G02B 6/12 | (2006.01) |
| G02B 6/293 | (2006.01) |
| G02B 6/13 | (2006.01) |
| G02F 1/225 | (2006.01) |
| B01J 37/34 | (2006.01) |
| B01J 37/12 | (2006.01) |

(52) U.S. Cl.
CPC ............ *G02B 6/29395* (2013.01); *B01J 37/12* (2013.01); *B01J 37/349* (2013.01); *G02B 6/13* (2013.01); *G02B 6/2934* (2013.01); *G02F 1/2257* (2013.01)

(58) Field of Classification Search
CPC ....................... G02B 6/29335; G02B 6/29338; G02B 6/29341; G02B 6/29343
See application file for complete search history.

(56) References Cited

U.S. PATENT DOCUMENTS

| | | | | |
|---|---|---|---|---|
| 6,751,368 B2 * | 6/2004 | Lim | ...................... | B82Y 20/00 385/14 |
| 7,725,000 B2 * | 5/2010 | Schrauwen | ............ | B82Y 20/00 385/129 |
| 7,853,108 B2 * | 12/2010 | Popovic | ................. | B82Y 20/00 385/126 |
| 8,170,388 B2 * | 5/2012 | Schrauwen | ............ | B82Y 20/00 385/129 |
| 2009/0180747 A1 * | 7/2009 | Schrauwen | ............ | B82Y 20/00 385/129 |
| 2010/0189402 A1 * | 7/2010 | Schrauwen | ............ | B82Y 20/00 385/129 |
| 2011/0013874 A2 * | 1/2011 | Schrauwen | ............ | B82Y 20/00 385/129 |
| 2014/0132893 A1 * | 5/2014 | Baets | ................ | G02F 1/133788 349/94 |

* cited by examiner

*Primary Examiner* — Rhonda Peace
(74) *Attorney, Agent, or Firm* — Park, Vaughan, Fleming & Dowler LLP

(57) ABSTRACT

An optical device is described. This optical device includes optical components having resonance wavelengths that match target values with a predefined accuracy (such as 0.1 nm) and with a predefined time stability (such as permanent or an infinite time stability) without thermal tuning and/or electronic tuning. The stable, accurate resonance wavelengths may be achieved using a wafer-scale, single (sub-second) shot trimming technique that permanently corrects the phase errors induced by material variations and fabrication inaccuracies in the optical components (and, more generally, resonant silicon-photonic optical components). In particular, the trimming technique may use photolithographic exposure of the optical components on the wafer in parallel, with time-modulation for each individual optical component based on active-element control. Note that the physical mechanism in the trimming technique may involve superficial room-temperature oxidation of the silicon surface, which is induced by deep-ultraviolet radiation in the presence of oxygen.

20 Claims, 7 Drawing Sheets

SINGLE SHOT CORRECTION OF RESONANT OPTICAL COMPONENTS

GOVERNMENT LICENSE RIGHTS

This invention was made with U.S. Government support under Agreement No. HR0011-08-9-0001 awarded by DARPA. The U.S. Government has certain rights in the invention.

BACKGROUND

1. Field

The present disclosure relates to techniques for communicating optical signals. More specifically, the present disclosure relates to correcting resonant optical components that are used to communicate optical signals.

2. Related Art

Silicon photonics is a promising technology that can provide large communication bandwidth, large density, low latency and low power consumption for inter-chip and intra-chip connections. In the last few years, significant progress has been made in developing low-cost components for use in inter-chip and intra-chip silicon-photonic connections, including: high-bandwidth efficient silicon modulators, low-loss optical waveguides, wavelength-division-multiplexing (WDM) components, and high-speed CMOS optical-waveguide photo-detectors. Interference-based silicon devices, such as silicon ring resonators, arrayed waveguide gratings (AWGs), and Mach-Zehnder interferometers (MZIs), have become an integral part of a silicon-photonic interconnect design.

However, interference-based silicon devices usually require precise control of the phase relationship to achieve a desired spectral response. The phase of the optical mode in these interference-based silicon devices is directly proportional to the effective index of refraction of the optical waveguide. As a consequence, small changes in the optical waveguide geometry or the index of refraction of the materials used in the core and cladding of the optical waveguide can strongly influence the resonance wavelength of an interference-based silicon device. In case of the silicon ring resonator, for example, we have the following relationship:

$$\frac{\Delta \lambda_{res}}{\lambda_{res}} \approx \frac{\Delta n_{eff}}{n_g},$$

where $n_g$ is the group index of refraction of the optical waveguide, $n_{eff}$ is the effective index of refraction, and $\lambda_{res}$ is the originally designed or target resonance wavelength. Therefore, a change of the effective index of refraction on the order of approximately 0.1% can induce a resonant-wavelength shift of around 1.55 nm (i.e., 200 GHz), which is larger than 3-dB resonance width of most ring resonators with Q-value higher than 1000. For a practical high-performance application, a change in the effective index of refraction of this magnitude typically cannot be tolerated. This often puts very tight constraints on the precision and purity of the fabrication process and materials used, even for the most sophisticated foundry processes currently available.

A variety of factors can change the effective index of refraction, including: variation in the silicon-on-insulator (SOI) thickness, variation in photolithography, variation in etching and/or uncertainties in the index of refraction of the materials used. For example, the variation in the thickness of standard SOI wafers, can offset the height of the fabricated optical waveguide by ±2 nm). Moreover, variations in focus, exposure energy, developing condition and/or unintentional hard bake-induced reflow of developed photoresist pattern during photolithography can change the width of the fabricated optical waveguide by ±5 nm. Furthermore, it is often difficult to control the etch depth better than ±2 nm with the typical etch rates of about 4 nm/second for most reactive-ion-etch (RIE) systems. In particular, the heating pattern and electric-field distribution across the wafer can cause variations in the etch depth, even when reduced by helium backside cooling and other methods that are intended to improve uniformity. Similarly, imperfect verticality of etched optical waveguide sidewalls can change the effective index of refraction of the fabricated optical waveguide. Additionally, the effective index of refraction can be offset by: small variations in the doping concentration of silicon material, variations in the density and stress of tetraethyl orthosilicate-based silicon oxide cladding and/or other causes. Consequently, fabrication of silicon ring resonators with precisely specified resonance wavelengths is often hard to achieve even with state-of-the-art foundry processes.

One approach for addressing this problem is post-fabrication compensation of phase errors to shift the resonance wavelength to the desired or target value (which is henceforth referred to as 'trimming'). For example, active elements (such as micro-heaters) may be used to induce a shift in the resonance wavelength based on the thermo-optic effect. However, because of the large number of integrated devices per die and the possibility of thermal crosstalk, trimming using active elements often results in excessive power consumption.

In principle, a desired shift in the resonance wavelength can be obtained using per-device (low volume) and permanent single-shot post-fabrication trimming. However, these fabrication techniques usually are time-consuming, often have insufficient trimming range and/or the resulting trimmed resonance wavelengths typically do not have sufficient long-term stability.

Hence, what is needed is a ring-resonator modulator and an associated fabrication technique without the above-described problems.

SUMMARY

One embodiment of the present disclosure provides a photonic chip that includes: a substrate; a buried-oxide layer disposed on the substrate; and a semiconductor layer disposed on the buried-oxide layer, where optical components are defined in the semiconductor layer. The optical components have resonance wavelengths, and the resonance wavelengths match target values with a predefined accuracy and with a predefined time stability without thermal tuning and/or electronic tuning.

Note that the predefined accuracy may be less than 0.1 nm.

Additionally, the optical components may be trimmed so that the resonance wavelengths match the target values within the predefined accuracy by oxidizing the semiconductor layer proximate to the optical components, and the amount of oxidation may be specific to a given optical component. In particular, the trimming may modify effective indexes of refraction of the optical components. Note that the resonance wavelengths at a given temperature may be stable as a function of time.

In some embodiments, the substrate includes a cavity, defined by an edge, through the substrate and the buried-oxide layer. Oxidizing of the semiconductor layer proximate to the optical components may occur via the cavity. Additionally, the photonic chip may include: a second buried-oxide layer disposed on the oxidized semiconductor layer in the cavity; and an overcoat layer disposed on the second buried-oxide layer. Note that the overcoat layer may include a metal.

Moreover, the photonic chip may include a cladding layer disposed on the semiconductor layer, where the cladding layer has a transmission coefficient exceeding a predefined value for at least a wavelength in an ultraviolet band of wavelengths. For example, the wavelength may be 193 nm or 248 nm, so that the deep-ultra-violet (DUV) emission wavelengths of argon-fluoride or krypton-fluoride excimer lasers can be transmitted through the cladding layer to enable low-temperature oxidation of silicon.

Note that the substrate, the buried-oxide layer and the semiconductor layer may constitute a silicon-on-insulator technology.

In some embodiments, the optical components are trimmed so that the resonance wavelengths match the target values within the predefined accuracy without using a polymer, and the amount of trimming is specific to the given optical component.

Another embodiment provides a system that includes: a processor; memory that stores a program module; and the photonic chip.

Another embodiment provides a method for trimming the resonance wavelengths of the optical components. During the method, the optical components are defined in the semiconductor layer disposed on the buried-oxide layer on the silicon-on-insulator substrate. Then, the resonance wavelengths of the optical components are trimmed so that the resonance wavelengths match the target values within the predefined accuracy and with the predefined time stability by oxidizing the semiconductor layer proximate to the optical components, where the amount of oxidation is specific to the given optical component.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way.

Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an optical device, a system that includes the optical device and a technique for trimming the optical device are described. This optical device includes optical components having resonance wavelengths that match target values with a predefined accuracy (such as 0.1 nm) and with a predefined time stability (such as permanent or an infinite time stability, i.e., the resonance wavelengths may be locked to the target values at a given temperature) without thermal tuning and/or electronic tuning. The stable, accurate resonance wavelengths may be achieved using a wafer-scale, single (sub-second) shot trimming technique that permanently corrects the phase errors induced by material variations and fabrication inaccuracies in the optical components (and, more generally, resonant silicon-photonic optical components). In particular, the trimming technique may use photolithographic exposure of the optical components on the wafer in parallel, with time-modulation for each individual optical component based on active-element control. Note that the physical mechanism in the trimming technique may involve superficial room-temperature oxidation of the silicon surface, which is induced by deep-ultraviolet radiation in the presence of oxygen. The amount of induced index of refraction change may be monotonously dependent on the exposure time (for a constant exposure flux), and can be repeatable.

By wavelength-locking the optical components in the optical device, this trimming technique may allow the individual optical components to be accurately and permanently calibrated or corrected. Therefore, the optical device and the trimming technique may facilitate high-speed inter- and intra-chip silicon-photonic interconnects, as well as associated systems that can include the optical device (such as high-performance computing systems).

In the discussion that follows, ring resonators (and, in particular, ring-resonator modulators) are used as an illustration of the optical components (and, more generally, resonant silicon-photonic optical components). However, the trimming technique may be used to permanently calibrate or correct the resonance wavelengths of a wide variety of silicon-photonic optical components.

Figure 1:
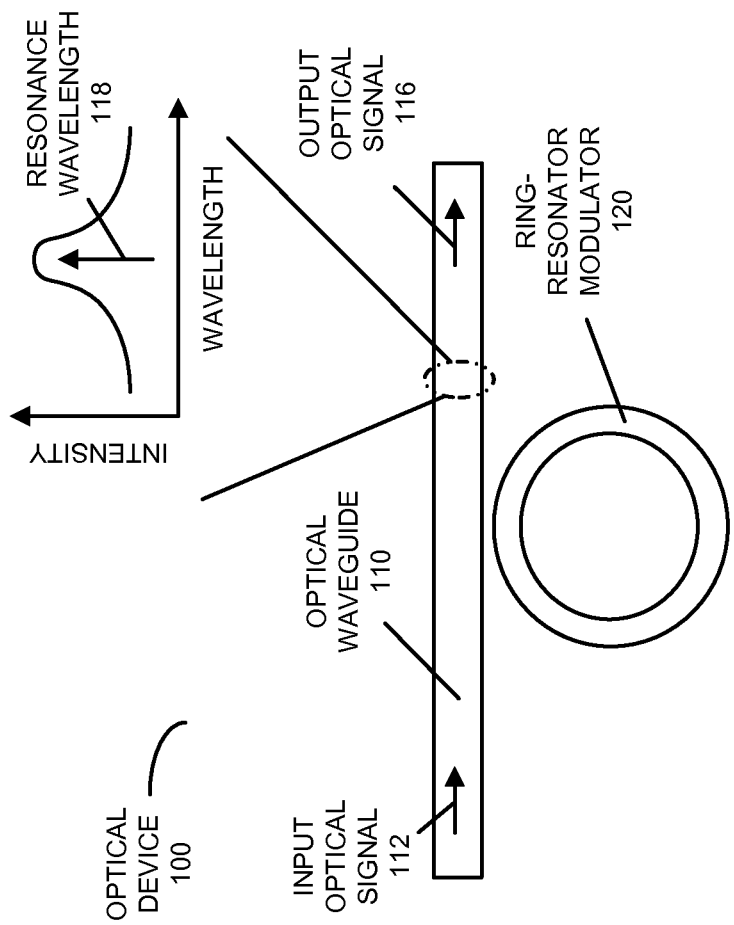
FIG. 1 is a block diagram illustrating an optical device in accordance with an embodiment of the present disclosure.

We now describe embodiments of the optical device. FIG. 1 presents a block diagram of an optical device 100 that includes one or more instances of an optical component, such as a ring-resonator modulator. This optical device includes an optical waveguide 110 that conveys an input optical signal 112 that includes one or more carrier wavelengths ($\lambda_1, \lambda_2, \ldots \lambda_n$), and an output optical signal 116 that includes resonance wavelength ($\lambda_o$) 118, which may be provided to a link terminus. Moreover, optical device 100 includes one or more ring-resonator modulators (such as ring-resonator modulator 120), having resonance wavelength 118, optically coupled to optical waveguide 110. Furthermore, resonance wavelength 118 may match a target value with a high accuracy (such as within 0.1 nm of the target value) and, at a given temperature, resonance wavelength 118 may be time-invariant (i.e., resonance wavelength 118 may have a time stability that is permanent or infinite). Note that ring-resonator modulator 120 may not use active tuning, such as thermal tuning and/or electronic tuning (such as carrier injection, carrier depletion and/or carrier accumulation).

Moreover, ring-resonator modulator 120 may be characterized by its: quality (Q) factor, bandwidth, coupling wavelength to optical waveguide 110, and/or free-spectral range (or, equivalently, its size, such as the radius of ring-resonator modulator 120). (Note that a small ring-resonator modulator has a large free-spectral range, and a large ring-resonator modulator has a small free-spectral range.) Furthermore, the Q factor may determine the bandwidth of the modulation associated with ring-resonator modulator 120. In addition, the Q factor of ring-resonator modulator 120 may be a function of the optical coupling between optical waveguide 110 and ring-resonator modulator 120, ring-resonator modulator 120, and the optical loss in ring-resonator modulator 120.

We now describe the trimming technique. In principle, the requirements for the single-shot trimming technique in post-fabrication treatment of CMOS photonic integrated circuits include: long-term stability, fast trimming, and sufficient trimming range. In particular, ideally, the single-shot trimming technique should permanently change the resonance wavelength to a target value for a given ring resonator at a given temperature. This may preclude the use of polymer materials, which often exhibit relaxation, moisture absorption, photo-aging and other negative properties that typically make these materials unsuitable for use in CMOS processing. Moreover, because the number of ring-resonator modulators per die in most WDM applications can be between 100 and 10,000, and because wafers typically include around 1000 dies (depending on the wafer diameter and die size), sub-second trimming times are usually necessary to make the wafer-level trimming feasible. Furthermore, because small ring and disc resonators have large (greater than 20 nm) free-spectral ranges, the trimming range typically must be large enough to accommodate at least one free-spectral range for a given resonant silicon-photonic optical component.

For post-fabrication trimming of CMOS photonic silicon ring-resonator devices, the described trimming technique may be: permanent, ultra-fast (less than one second trimming time per device), and capable of achieving a trimming range in excess of 30 nm. This trimming technique may be implemented after the front-end-of-the-line (FEOL) CMOS process and/or after the back-end-of-the-line (BEOL) CMOS process.

Silicon WDM ring devices (such as ring-resonator modulators on the transmitter side and/or drop filters on the receiver side) may be fabricated using a Freescale HIP07 CMOS-compatible silicon photonic fabrication process. However, inevitable variations in the optical waveguide geometry may induce shifts in the designed or target resonant wavelengths and mismatches between the transmitter and the receiver wavelengths. In order to maintain a low-power budget, the trimming technique may use 'single-shot' post-fabrication trimming based on localized low-temperature oxidation of silicon, which can be induced by deep-ultraviolet (DUV) excited dimer (excimer) laser irradiation in an oxygen atmosphere. In the FEOL embodiment, a top-side trimming operation may be performed after the last high-temperature operation in the fabrication process. Alternatively or additionally, in the BEOL embodiment, the silicon film may be oxidized from: the substrate side of the ring-resonator device (i.e., the 'bottom' of the optical waveguide) and/or the top, through a transparent cladding, which includes an oxygen-supplying layer (i.e. an 'oxygen fuse') or implanted oxygen. In both embodiments, the trimming technique may preserve the integrity of the CMOS stack. Moreover, in both embodiments oxidation of silicon layers may effectively reduce the rib and, in the BEOL embodiment, the slab height of the silicon optical waveguide, thereby trimming the effective index of refraction to the desired value. (The 'effective index of refraction' of an optical waveguide is the weighted sum of the material indexes of refraction of the core(s) and cladding(s) (i.e., all the layers that the optical waveguide is comprised of), where the weighting coefficients are the respective confinements factors. Moreover, the confinement factors indicate how much optical power is confined to certain layers. In other words, if the core material has an index of refraction of 3, the cladding has an index of refraction of 1, and 80% of light in the optical waveguide is confined to the core and 20% of light is confined to the cladding, then the effective index of refraction is $0.8 \cdot 3 + 0.2 \cdot 1 = 2.4 + 0.2 = 2.6$.) Note that the trimming range in the trimming technique may satisfy the requirements of a typical micro-ring device (which may have approximately a 12 nm free-spectral range) and micro-disc device (which may have approximately a 25 nm free-spectral range) used in WDM links. However, there is no upper or lower bound on the free-spectral range in the trimming technique, i.e., it can be applied to a wide variety of ring devices and, more generally, optical components. Thus, the free-spectral range may be between 0.1 and 50 nm.

In order to support single-shot trimming, the trimming technique may use a photolithography step-and-repeat (stepper) approach, in which a light source (such as a laser source) illuminates a photolithography mask, and the modulated light passes through a reduction lens prior to illuminating the exposed wafer. Moreover, the trimming technique may use an 'active mask' principle, in which the photolithography mask is a reverse-tone and expanded copy of the optical waveguide layer mask. Furthermore, the actual reticle plate may include a time-control element (such as a micro-shutter, a MEMS mirror and/or a liquid-crystal modulator) that provides device-level exposure timing control. The desired trimming dosage may be applied to individual ring resonators by time control of the exposure, which may be implemented by the time-control element. (Thus, the active time-control element may provide a ring-dependent cutoff.) In this way, the ring resonators on a die may be exposed at the same time and may receive the appropriate trimming dosage. (Note that, prior to trimming, one or more resonance-wavelength measurements may be performed on some or all of the devices across a die or a wafer to determine the necessary change to the resonance wavelengths of different ring resonators across a die, different dies and/or the wafer.)

In the trimming technique, a deep ultra-violet (DUV) excited dimer (excimer) laser source may be used (such as a 248 nm krypton-fluoride laser source or a similar 193 nm argon-fluoride laser source), which may be capable of delivering optical power fluxes in excess of 200 $mJ/cm^2$ (either continuous wave or using a pulse or repetition rate of several kilohertz). Moreover, the numeric aperture of the stepper may be 0.57. Furthermore, the lens reduction ratio (N:1) may range from 3.3:1 to 5:1.

Figure 2:
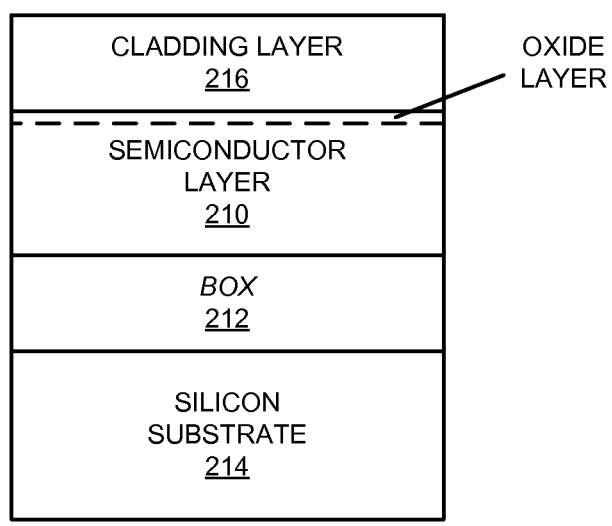
FIG. 2 is a drawing illustrating trimming of the optical device of FIG. 1 in accordance with an embodiment of the present disclosure.

FIG. 2 presents a drawing illustrating post-FEOL top-side trimming of optical device 100 (FIG. 1) to permanently correct phase errors using a single-shot exposure. As shown in FIG. 2, the optical device may be disposed on an integrated circuit. In particular, portions of the optical device (including optical waveguide 110 and ring-resonator modulator 120 in FIG. 1) may be defined in a silicon semiconductor layer 210 in an SOI substrate. This semiconductor layer may be disposed on a buried-oxide (BOX) layer 212 (such as silicon dioxide), which, in turn, is disposed on a silicon substrate 214. In some embodiments, the silicon in semiconductor layer 210 is less than 0.5 µm thick, and the buried-oxide layer 212 has a thickness between 0.1 and 10 µm. Moreover, in some embodiments the light is confined in semiconductor layer 210 and may be surrounded on all sides (including below) by an oxide. Note that cladding layer 216 may be disposed on semiconductor layer 210. This cladding layer may be transparent for the wavelength in the DUV laser or light source.

Note that a FEOL CMOS process may encompass all high-temperature (greater than 450 C) processes, such as gate oxidation and implant drive-in anneal. After the FEOL processing, and before the deposition of the first dielectric layer, the optical waveguides may be conveniently exposed for trimming. As shown in FIG. 2, the surface of the silicon in semiconductor layer 210 may be oxidized under DUV exposure in oxygen atmosphere, which may effectively reduce: the core width, the core height and the slab height. (Note that only a portion of a ring resonator may need to be oxidized, such as 20% of the ring resonator.) As described further below with reference to FIG. 4, these reductions may directly correspond to changes in the effective index of the refraction of the optical waveguide.

Figure 3:
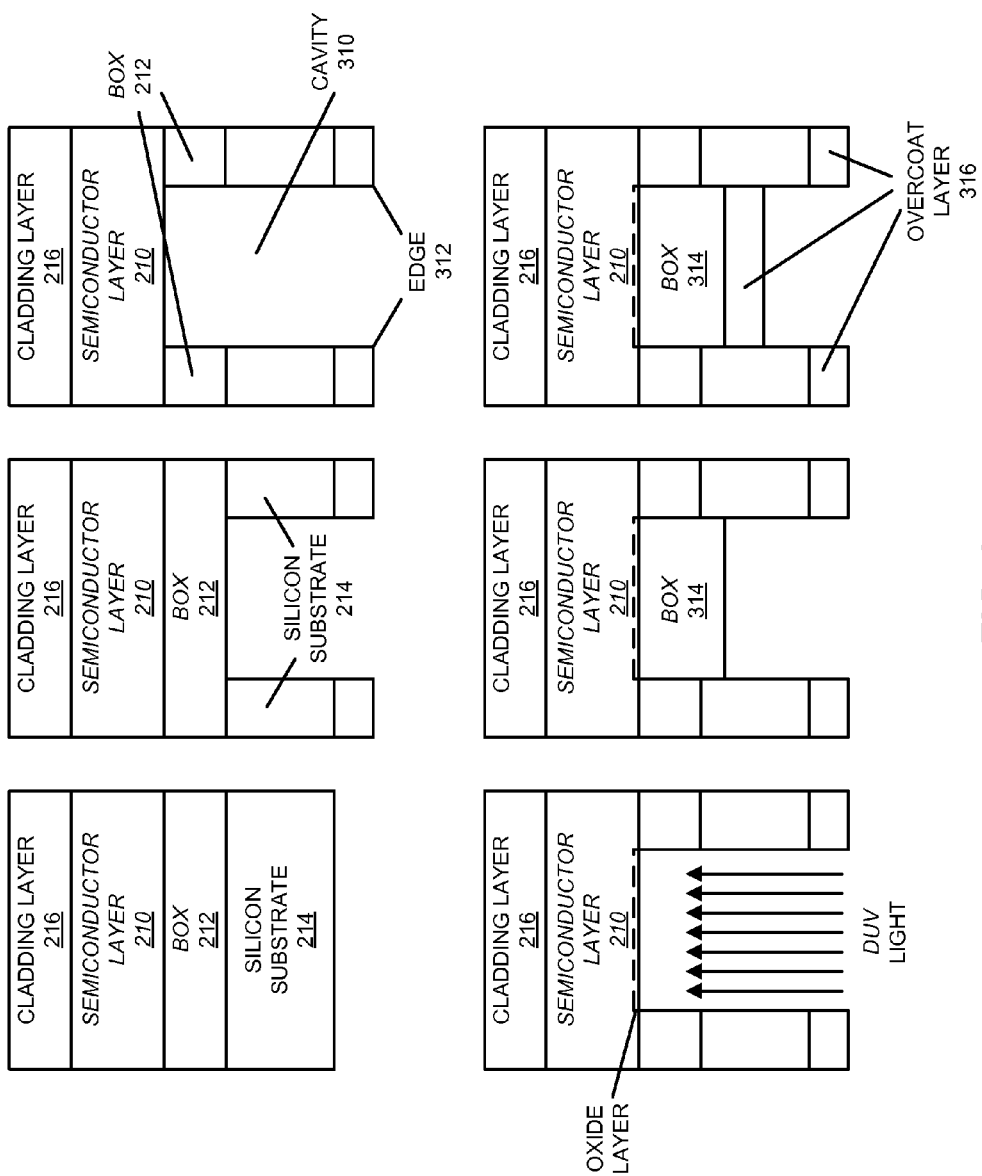
FIG. 3 is a drawing illustrating trimming of the optical device of FIG. 1 in accordance with an embodiment of the present disclosure.

FIG. 3 presents a drawing illustrating post-BEOL (i.e. post fabrication using the final product wafer) backside trimming of optical device 100 (FIG. 1) to permanently correct phase errors using a single-shot exposure. Using the fabricated photonic-CMOS wafer, an opening may be lithographically defined on the backside of the wafer. Because the device-to-device separation may be approximately 50 µm, this operation may not require high-alignment accuracy and may be performed using standard backside alignment techniques. Then, through-substrate vias may be etched using a Bosch process, alternating sulfur hexafluoride/oxygen etch with octafluorocyclobutane passivation cycles. The buried-oxide layer may be wet etched in a 6:1 buffered oxide-etch (BOE) solution with high (greater than 100:1) selectivity to thin-silicon membrane (such as the silicon slab), which provides the etch-stop. The resulting cavity 310 may be defined by edge 312.

After removal of the buried-oxide layer, the silicon film may be oxidized by DUV irradiation in an oxygen atmosphere. The depth of oxidation, which is directly related to the amount of induced change in the effective index of refraction and the resonance-wavelength shift may be controlled by tuning the exposure time.

Next, buried-oxide layer (BOX) 314 may be re-deposited using standard low-temperature deposition techniques (such as tetraethyl orthosilicate spinning or plasma-enhanced chemical vapor deposition). Furthermore, a protective overcoat layer 316 (such as a metal cap) may be deposited on the backside of the wafer, which can also be utilized as a thermal shunt for cooling of active components.

In another version of the post-BEOL trimming embodiment, top-side trimming is used. In particular, because the final product wafer has several layers of dielectric on top of the optical waveguide, oxygen may be locally provided by implanting oxygen species into the silicon after the FEOL processing. For example, an implantation energy of 1.2 keV with a 7° tilt results in an implanted oxygen-ion distribution that peaks at a depth of 5 nm and that rolls-off to a maximum depth of about 15 nm. (Alternatively, an oxygen-providing layer, which provides oxygen when exposed by the DUV laser, may be incorporated in the stack.) This oxygen may remain trapped in the silicon lattice through the BEOL processes, creating an 'oxygen fuse' that may be activated after BEOL processing by the DUV irradiation in the trimming technique. This version of the post-BEOL trimming embodiment may have a trimming performance that is equal to that of the post-FEOL trimming embodiment.

Figure 4:
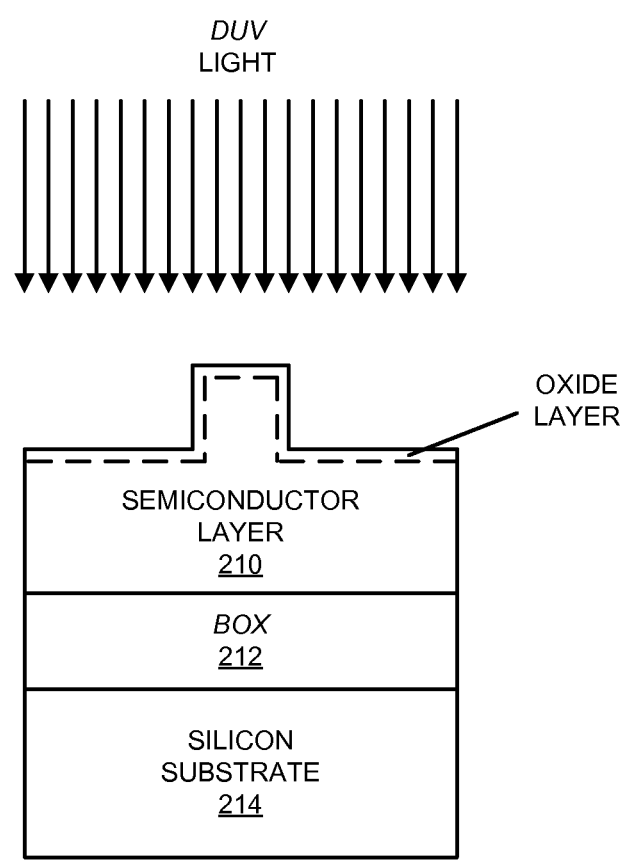
FIG. 4 is a drawing illustrating a trimming mechanism for the optical device of FIG. 1 in accordance with an embodiment of the present disclosure.
Figure 5:
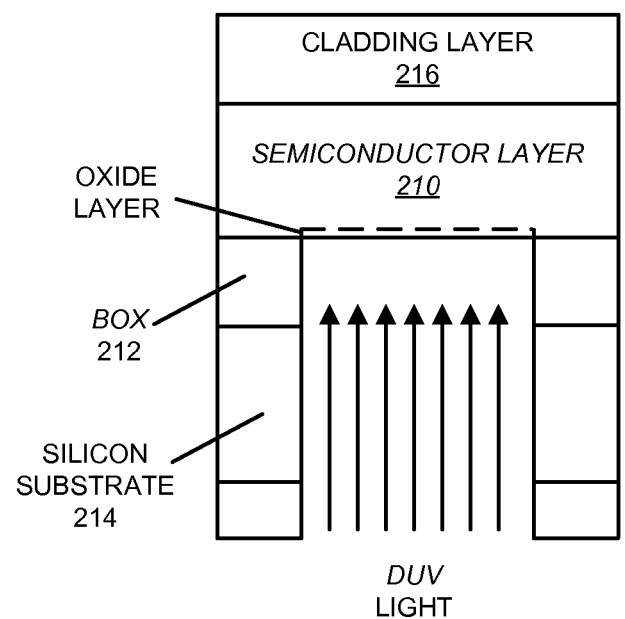
FIG. 5 is a drawing illustrating a trimming mechanism for the optical device of FIG. 1 in accordance with an embodiment of the present disclosure.

FIG. 4 presents a drawing illustrating a trimming mechanism for optical device 100 (FIG. 1) using post-FEOL trimming, and FIG. 5 presents a drawing illustrating a trimming mechanism for optical device 100 (FIG. 1) for post-BEOL trimming. For most practical WDM links, using small and compact silicon ring resonators, the free-spectral range of the ring resonator is usually smaller than 24 nm (3 THz). The trimming technique may be able to cover the full free-spectral range of ring resonators. In particular, in the post-FEOL embodiment, the required oxidation depth may be approximately 5 nm of silicon. Alternatively, in the post-BEOL embodiment, approximately 11 nm of silicon may need to be oxidized. As discussed further below, these oxidation thicknesses may be achieved with exposure times of approximately one second.

In an exemplary embodiment, a ring-resonator modulator uses a Luxtera/Freescale optical waveguide geometry (with a thickness of the silicon semiconductor layer of 300 nm, a 220 nm deep etch, and a 380 nm wide optical waveguide). The achievable trimming range for post-FEOL is calculated as a 4.615 nm resonance-wavelength shift for each nanometer of oxidation depth (the amount of silicon oxidized). Similarly, the achievable trimming range for post-BEOL is calculated as a −2.308 nm resonance-wavelength shift for each nanometer of oxidation depth (the amount of silicon oxidized).

Regarding the physical process of DUV-induced oxidation in an oxygen atmosphere, laser-induced oxidation of silicon has been studied by several researchers. This work demonstrated ultrafast oxidation of silicon in dry oxygen atmosphere, using a xenon-monochloride excimer laser, with 5 ns pulses, having approximately 5 mJ energy at a wavelength of 308 nm. The oxidation rate was reported to be greater than 10 nm/s, with a near-ideal stoichiometry of the grown oxide. Additional research studied the wavelength dependence of the oxidation rate in both dry and wet atmospheres. This research showed that temperature increase, induced by absorption of the laser light in silicon, does not play the main role in the increased oxidation rate. Instead, it has been proposed that 3.5 eV photons, used in the experiment, induced the transition of electrons from the conduction band of silicon, to the conduction band of silicon dioxide (which has a barrier height of 3.2 eV), where the electrons charge dissolved oxygen to form $O_2^-$ reactant ions. Note that the principal oxidants in dry growth of silicon dioxide are $O^-$, $O_2^-$ and $O^-$, whereas $O_2$ species require an electron ($O_2^-$) to insert themselves into the silicon lattice. Thus, the trimming technique may use deep free-radical formation to achieve low-temperature oxidation.

In these ways, the trimming technique may provide a means for permanent, large-volume, parallel, ultra-fast, one-shot correction of fabrication inaccuracies and SOI-thickness variation-induced phase errors in silicon ring resonators and other silicon photonic devices (such as AWGs, Echelle gratings, MZIs, etc.). This trimming technique may not use polymer materials (or other new materials that are not available in standard CMOS processing), which carry significant risk of aging and performance degradation over time. Moreover, the trimming technique may not involve the selective removal of already fabricated layers on top of the ring resonator. Furthermore, the post-BEOL oxidation trimming embodiments may not affect the performance of ring resonators and other CMOS devices on die. This trimming technique may have a large spectral trimming range (approximately 30 nm), which may be sufficient for WDM links using ultra-compact ring or disc resonators.

Figure 6:
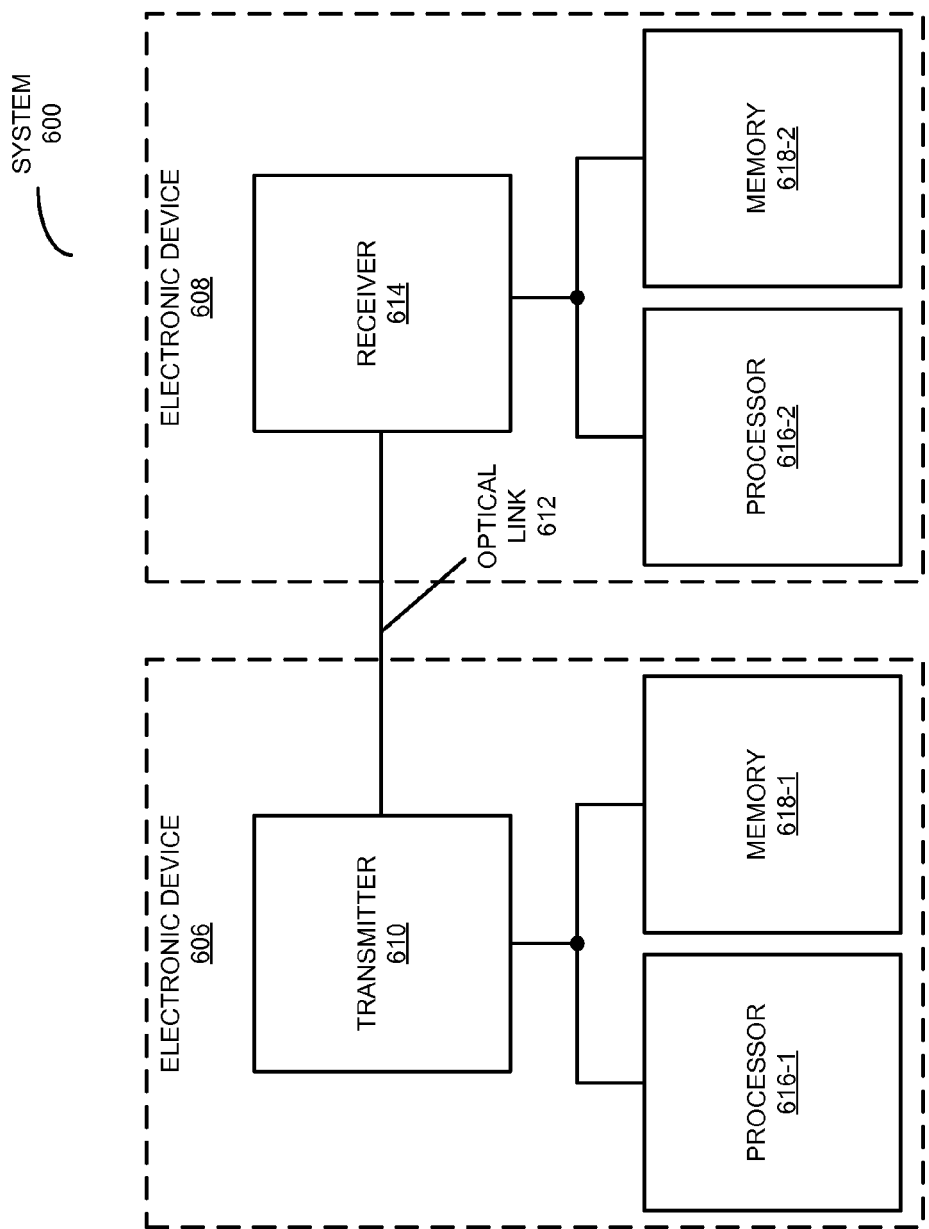
FIG. 6 is a block diagram illustrating a system that includes the optical device of FIG. 1 in accordance with an embodiment of the present disclosure.

One or more of the preceding embodiments of the optical device may be included in a system and/or an electronic device. This is illustrated in FIG. 6, which presents a block diagram illustrating a system 600 that includes one or more instances of the optical device in either or both of electronic devices 606 and 608.

In some embodiments, system 600 includes: a transmitter 610 that includes the input optical waveguide, the output optical waveguide and the ring-resonator modulator; an optical link 612 optically coupled to transmitter 610; and a receiver 614. Moreover, system 600 may include instances of processors 616 and memory 618.

The optical device may be used in a variety of applications, including: VLSI circuits, communication systems (such as WDM), storage area networks, data centers, networks (such as local area networks), and/or computer systems (such as multiple-core processor computer systems). Note that system 600 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

Optical device 100 (FIG. 1) and/or system 600 may include fewer components or additional components. For example, the semiconductor layer may include polysilicon or amorphous silicon. Furthermore, a wide variety of fabrication techniques may be used to fabricate the optical device in the preceding embodiments, as is known to one of skill in the art. In addition, a wide variety of optical components may be used in or in conjunction with the optical device (such as alternative optical modulators that replace ring-resonator modulator 120 in FIG. 1).

Although these embodiments are illustrated as having a number of discrete items, the embodiments of the optical device and the system are intended to be functional descriptions of the various features that may be present rather than structural schematics of the embodiments described herein. Consequently, in these embodiments two or more components may be combined into a single component, and/or a position of one or more components may be changed.

Figure 7:
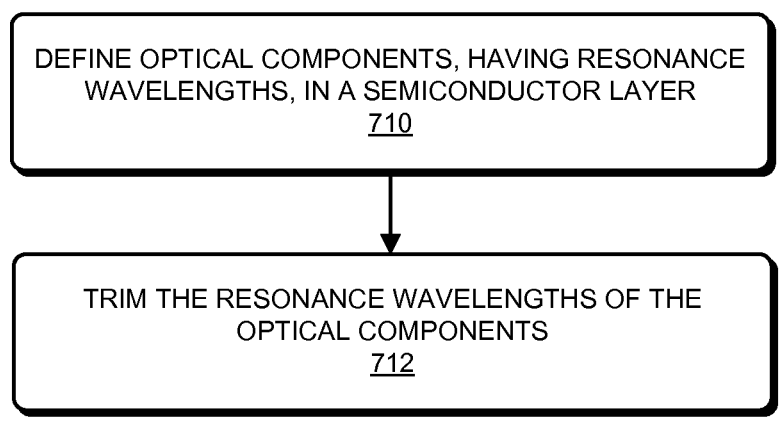
FIG. 7 is a flow chart illustrating a method for trimming resonance wavelengths of optical components in accordance with an embodiment of the present disclosure.

We now describe embodiments of the method. FIG. 7 presents a flow chart illustrating a method 700 for trimming the resonance wavelengths of optical component, such as ring resonators. During the method, optical components, having resonance wavelengths, are defined in a semiconductor layer (operation 710) disposed on a buried-oxide layer on a silicon-on-insulator substrate. Then, the resonance wavelengths of the optical components are trimmed (operation 712) so that the resonance wavelengths match target values within a predefined accuracy and with a predefined time stability (such as years, e.g., the resonance wavelengths may change by less than 0.1 nm over 1, 5, 10 or more years, or infinite time stability) by oxidizing the semiconductor layer proximate to the optical components, where an amount of oxidation is specific to a given optical component.

In some embodiments of method 700, there may be additional or fewer operations. Moreover, the order of the operations may be changed, and/or two or more operations may be combined into a single operation.

While the preceding embodiments illustrate the use of the optical device in conjunction with an optical link, the optical device may be used in applications other than communications, such as: manufacturing (cutting or welding), a lithographic process, data storage (such as an optical-storage device or system), medicine (such as a diagnostic technique or surgery), a barcode scanner, entertainment (a laser light show), and/or metrology (such as precision measurements of distance).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A photonic chip, comprising:
a substrate;
a buried-oxide layer disposed on the substrate; and
a semiconductor layer disposed on the buried-oxide layer,
    wherein optical components are defined in the semiconductor layer;
    wherein the optical components have resonance wavelengths;
    wherein the optical components are trimmed so that the resonance wavelengths match target values within a predefined accuracy and with a predefined time stability by oxidizing the semiconductor layer proximate to the optical components; and
    wherein the amount of oxidation is specific to a given optical component.

2. The photonic chip of claim 1, wherein the predefined accuracy is 0.1 nm.

3. The photonic chip of claim 1, wherein the optical components include ring resonators having a free-spectral range between 0.1 and 50 nm.

4. The photonic chip of claim 1, wherein the trimming modifies effective indexes of refraction of the optical components.

5. The photonic chip of claim 1, wherein the substrate includes a cavity, defined by an edge, through the substrate and the buried-oxide layer;
    wherein the optical components are trimmed so that the resonance wavelengths match the target values within the predefined accuracy by oxidizing the semiconductor layer proximate to the optical components via the cavity; and wherein the amount of oxidation is specific to the given optical component.

6. The photonic chip of claim 5, wherein the trimming modifies effective indexes of refraction of the optical components.

7. The photonic chip of claim 5, further comprising:
a second buried-oxide layer disposed on the oxidized semiconductor layer in the cavity; and
an overcoat layer disposed on the second buried-oxide layer.

8. The photonic chip of claim 7, wherein the overcoat layer includes a metal.

9. The photonic chip of claim 1, further comprising a cladding layer disposed on the semiconductor layer, wherein the cladding layer has a transmission coefficient exceeding a predefined value for at least a wavelength in an ultraviolet band of wavelengths.

10. The photonic chip of claim 9, wherein the optical components are trimmed so that the resonance wavelengths match the target values within the predefined accuracy by oxidizing the semiconductor layer proximate to the optical components; and
wherein the amount of oxidation is specific to the given optical component.

11. The photonic chip of claim 10, wherein the trimming modifies effective indexes of refraction of the optical components.

12. The photonic chip of claim 9, wherein the wavelength is one of: 193 nm and 248 nm.

13. The photonic chip of claim 1, wherein the substrate, the buried-oxide layer and the semiconductor layer constitute a silicon-on-insulator technology.

14. The photonic chip of claim 1, wherein the optical components are trimmed so that the resonance wavelengths match the target values within the predefined accuracy without using a polymer; and
wherein the amount of trimming is specific to the given optical component.

15. The photonic chip of claim 1, wherein the optical components are trimmed so that the resonance wavelengths match the target values within the predefined accuracy;
wherein the amount of trimming is specific to the given optical component; and
wherein the resonance wavelengths at a given temperature are stable as a function of time.

16. The photonic chip of claim 1, wherein the optical components are trimmed by using photolithographic exposure of the optical components on the wafer in parallel, with time-modulation for each individual optical component based on active-element control.

17. A system, comprising:
a processor;
memory, coupled to the processor, configured to store a program module; and
a photonic chip, wherein the photonic chip includes:
a substrate;
a buried-oxide layer disposed on the substrate; and
a semiconductor layer disposed on the buried-oxide layer, wherein optical components are defined in the semiconductor layer;
wherein the optical components have resonance wavelengths;
wherein the optical components are trimmed so that the resonance wavelengths match target values within a predefined accuracy and with a predefined time stability by oxidizing the semiconductor layer proximate to the optical components; and
wherein the amount of oxidation is specific to a given optical component.

18. The system of claim 17, wherein the trimming modifies effective indexes of refraction of the optical components.

19. The system of claim 17, wherein the optical components are trimmed by using photolithographic exposure of the optical components on the wafer in parallel, with time-modulation for each individual optical component based on active-element control.

20. A method for trimming resonance wavelengths of optical components, the method comprising:
defining the optical components in a semiconductor layer disposed on a buried-oxide layer on a silicon-on-insulator substrate; and
trimming the resonance wavelengths of the optical components so that the resonance wavelengths match target values within a predefined accuracy and with a predefined time stability by oxidizing the semiconductor layer proximate to the optical components, wherein the amount of oxidation is specific to a given optical component.

* * * * *

UNITED STATES PATENT AND TRADEMARK OFFICE
CERTIFICATE OF CORRECTION

| | |
|---|---|
| PATENT NO. | : 9,465,169 B2 |
| APPLICATION NO. | : 14/625023 |
| DATED | : October 11, 2016 |
| INVENTOR(S) | : Djordjevic et al. |

Page 1 of 1

It is certified that error appears in the above-identified patent and that said Letters Patent is hereby corrected as shown below:

In the Specification

In Column 3, Lines 48-50, delete "Other features, aspects, and advantages of the subject matter described herein will become apparent from the following Detailed Description, Figures, and Claims." and insert the same on Column 3, Line 47 as a continuation of the same paragraph.

Signed and Sealed this
Thirteenth Day of June, 2017

Joseph Matal
*Performing the Functions and Duties of the
Under Secretary of Commerce for Intellectual Property and
Director of the United States Patent and Trademark Office*